Dec. 1, 1942.  H. A. MANTZ  2,303,701
SAFETY SHUT-OFF DEVICE
Filed June 30, 1939
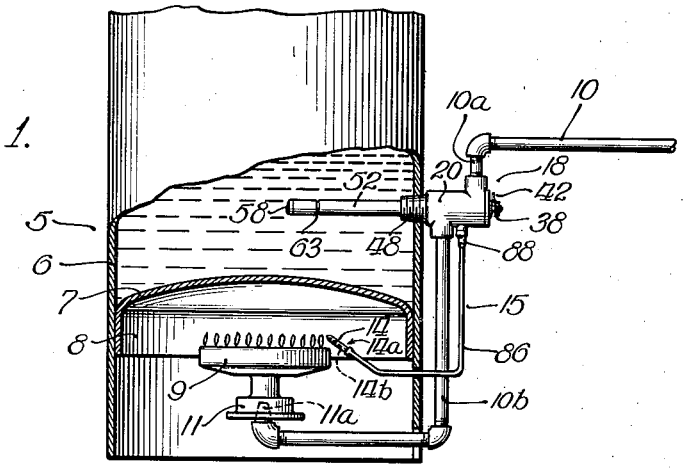
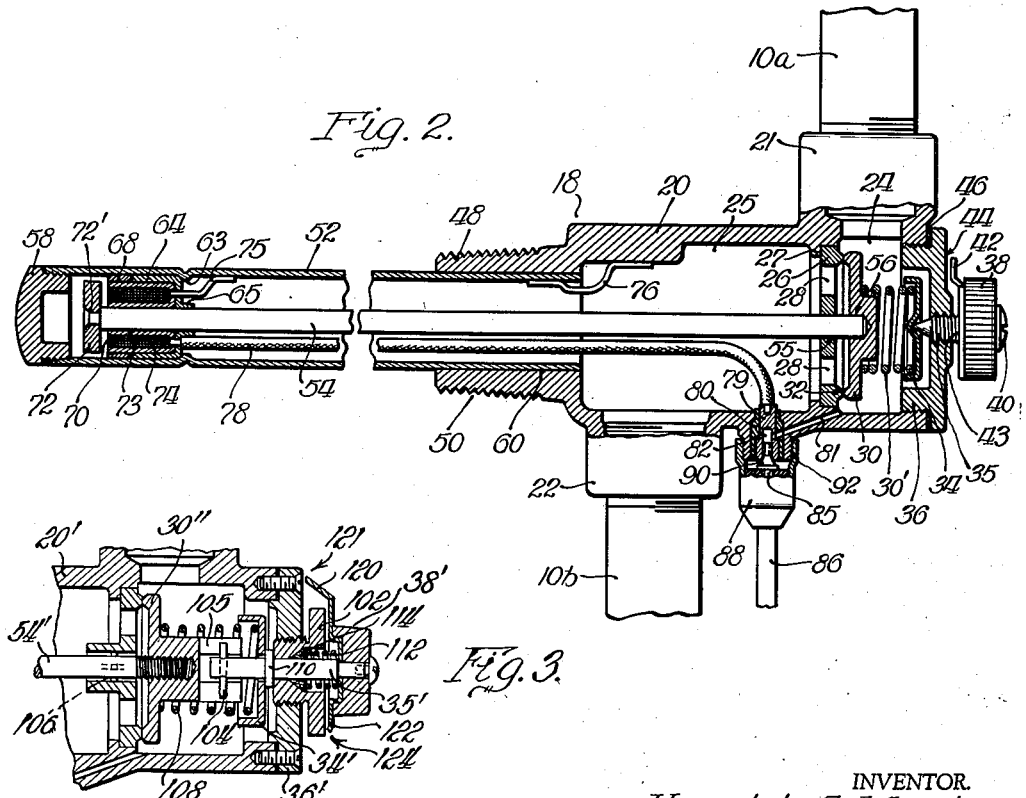
INVENTOR.
Harold A. Mantz
BY
Brown, Jackson, Boettcher & Dienner
ATTORNEYS.

Patented Dec. 1, 1942

2,303,701

UNITED STATES PATENT OFFICE 2,303,701

SAFETY SHUT-OFF DEVICE

Harold A. Mantz, Milwaukee, Wis., assignor to Milwaukee Gas Specialty Company, Milwaukee, Wis., a corporation of Wisconsin Application June 30, 1939, Serial No. 282,097

21 Claims. (Cl. 236—21)

This invention relates to a safety shut-off device and has particular relation to a safety shut-off device for automatically closing a valve in the fuel supply pipe for a burner upon extinguishment of a pilot light in juxtaposition to the burner and also when the temperature becomes excessive, or upon other abnormal, defective, or insufficient functioning or non-functioning of the apparatus.

While at least one of the particular devices which I shall describe hereinafter in connection with the drawing is a safety shut-off device adapted for use with water heaters and the like, it is to be understood that the invention in its broader aspects is not limited to such use, nor to embodiment in the particular type of devices shown and described.

One of the main objects of the invention is to provide an improved form of safety shut-off device under the control of a pilot burner and also under the control of the temperature of the water in the tank in the case of a water heater, or under the control of some other abnormal, defective, or insufficient functioning or non-functioning of the apparatus, whereby the safety shut-off device will operate to safety shut-off position upon extinguishment of the pilot burner and upon an undesirable rise in the temperature of the water in the tank, or upon other abnormal, defective, or insufficient functioning or non-functioning of the apparatus.

Another object of the invention is to provide in a heat regulator of the type comprising means for controlling the supply of fuel to the heating apparatus, means for setting the device for the desired temperature, and thermally operative means for operating the control means with temperature changes to maintain substantially selected temperatures, the combination therewith of safety shut-off means for shutting off the supply of fuel if the water in the tank rises beyond the desired temperature, or upon other abnormal, defective, or insufficient functioning or non-functioning of the apparatus, and also upon extinguishment of the pilot burner.

It is also an object of the invention to provide a device of the class described of simple and inexpensive construction, and which is effective and reliable in operation; also a device which is easy to assemble and install, and a device having a quick or snap acting shut-off for shutting off the supply of fuel not only at the desired temperature or upon other abnormal, defective, or insufficient functioning or non-functioning of the apparatus, but also upon extinguishment of the pilot burner.

Further objects and advantages of the invention will appear from the following detailed description taken in connection with the accompanying drawing in which:

Figure 1 is a vertical section through a fragment of a water heater, showing one illustrative embodiment of the invention in connection therewith;

Figure 2 is a vertical section taken axially through the heat regulator and safety shut-off device shown in Figure 1 and on a somewhat larger scale than Figure 1; and Figure 3 is a fragmentary section taken axially through another form of device embodying the present invention.

Referring first to Figure 1, a hot water heater is indicated generally at 5 and comprises a tank 6 adapted to contain the water to be heated. The tank 6 has a bottom 7 defining the upper wall of a heater chamber 8 in which is disposed a main burner 9.

The burner 9 is supplied with fuel by a pipe 10 which is connected to the burner through the body of the heat regulator, as will presently appear. Where the burner is a gas burner, the fuel supply pipe supplies gas thereto, and, in that case, the fuel supply pipe is preferably connected to the burner 9 through a suitable air and gas admixture chamber 11, the fuel delivery nozzle being indicated at 11a.

Associated with or in juxtaposition to the main burner 9 is the usual or any suitable or preferred pilot burner, indicated more or less diagrammatically at 14, which pilot burner is intended to remain lighted for the purpose of relighting the main burner upon extinguishment thereof. The pilot burner is supplied with fuel by a pipe 15 connected to the body of the safety shut-off device, as will hereinafter be described.

The safety shut-off device indicated in its entirety at 18 comprises a body or casing 20 having a fuel inlet 21 and an outlet 22 disposed with its axis parallel with the axis of the inlet 21 but offset relative thereto, although this may vary widely. The body or casing 20 is provided with an inlet chamber 24 communicating with the inlet 21, and an outlet chamber 25 communicating with the outlet 22. A valve seat 26 is seated against an annular flange 27, and is preferably held in place by pressed fit in the body 20, or otherwise as desired. The valve seat 26 has ports 28 for placing the inlet chamber 24 in communication with the outlet chamber 25.

A valve disc 30 has an annular raised portion which, in the position shown in Figure 2, seats against the annular raised seat 32, closing and shutting off communication between the inlet chamber 24 and the outlet chamber 25 through the valve seat ports 28. A spring cup 34 has a central depression which seats upon the pointed inner end of a temperature adjusting or selecting screw 35. The cup 34 serves as a seat for one end of a compression spring 36' which bears against the valve disc 30 at its other end and tends to hold the valve disc 30 seated or in closed position.

The outer end of the inlet chamber 24 is tapped to receive a valve cap 36, and the screw 35 is threaded through this cap 36 coaxial with respect to the valve disc 30. Fixed against relative rotation on the outer end of the screw 35 and adapted to turn the screw 35 therewith is a temperature selecting or adjusting knob or finger piece 38. The knob 38, which is shown secured to the adjusting screw 35 by a screw 40, may be held against rotation relative to the screw 35 by splining it thereon or by splaying the outer end of the screw 35 and forming the opening in the knob 38 with a flat portion for cooperation therewith, or otherwise as desired.

A pointer 42 is fixed at 43 to turn with the adjusting knob 38 and may be adapted to be turned and secured to the knob in different angular positions with respect thereto for calibration relative to scale 44. The outer end of the pointer 42 moves over a dial or scale marked on the valve cap 36, at 44, upon grasping the knob 38 and turning the same to thread the screw 35 into and out of the valve body. The scale has the usual or any preferred temperature markings, the range of which may be of any extent needed for the particular installation. A suitable gasket may be provided at 46 between the valve body and the flange on the cap 36.

The body or casing 20 of the device has an extension 48. This extension 48 is externally threaded at 50 to adapt it to be mounted in the shell or wall of the tank 6, as shown for example in Figure 1. The inlet 21 and outlet 22 are tapped internally to receive, respectively, the inlet and outlet pipe sections 10a and 10b of the fuel supply pipe 10 for the main burner.

A tube 52 preferably formed of metal or other good heat conducting material extends into the tank 6 for contact with the water therein. A rod 54 is disposed coaxially within the tube 52. The rod 54 is slidable axially through an opening 55 in the valve seat 26 and, at its outer end, is secured at 56 axially in the valve disc 30. The inner end of the tube 52 is closed by a plug 58 having threaded engagement therein. The other end of the tube 52 is secured to the valve body 20, for example, by pressed fit in the extension 48 as indicated at 60.

Spaced outwardly from its inner end the tube 52 has an annular depression forming an internal annular bead or shoulder 63. A cup 64 seats against the annular bead or shoulder 63 and is held in place in the tube 52 by pressed fit therein, or otherwise as desired. The outer end of the cup 64 has an opening surrounded by an annular flange 65 in which the rod 54 has sliding support.

The cup 64 is preferably a permanent magnet, or is provided with a permanent magnet in the manner shown and described in my copending application, Serial No. 282,096, filed June 30, 1939. With the increased magnetic strength now obtainable with the proper materials and the right treatment, the cup 64 itself may constitute the permanent magnet, as described. It may be relatively small and, at the same time, will have suitable strength for the intended purpose. Fixed by pressed fit, or otherwise, in the tube 52 and against the adjacent end of the permanent magnet 64 is an annular member 68 which is made of a relatively low temperature sensitive magnetic alloy or a relatively low Curie point material well known in the art. The Curie point member 68 is in good heat-conducting contact with the tube 52. The permanent magnet constitutes a source of magnetic flux for the Curie point member 68.

The member 68, by reason of the material of which it is composed and the magnetic flux set up by the permanent magnet 64, is ordinarily magnetic but becomes substantially non-magnetic or of reduced magnetic strength when heated to a sufficiently high temperature. In the illustrated embodiment of the invention, the critical temperature at which the member 68 becomes non-magnetic, or at least of sufficient strength conjointly with the electro-magnet 70 to hold the armature or keeper 72 in attracted position, is the temperature at which it is desired to operate the safety shut-off means to shut off the supply of fuel to the main burner.

The electromagnet 70 comprises an annnular magnet frame 73 of U-shaped section and a coil 74 wound between the annular legs of the magnet frame. One terminal of the coil 74 is grounded, for example, as indicated diagrammatically at 75, 76, to the housing or body 20. The other terminal of the coil 74 is connected, for example, through a conductor 78 to the terminal stud 79 of a quick detachable thermocouple connector. The stud 79 is insulated from the housing 20 by an insulating bushing 80.

The housing or body 20 is provided with a passageway 81 for supplying fuel to the pilot burner 14. This passageway by-passes the valve member to supply fuel to the pilot burner 14 regardless of whether the valve 30 is open or closed. Metering means (not shown) may, if desired, be provided for adjusting the supply of fuel to the pilot burner. The passageway 81 places the inlet chamber 24 in communication with the interior 82 of the terminal stud 79.

The pilot burner shown in the drawing is a combined thermocouple and pilot burner generally of the type shown and described in my co-pending application Serial No. 119,557, filed January 8, 1937, now Patent No. 2,271,506 dated January 27, 1942. Suffice it for purposes of the present invention to state that the combined thermocouple and pilot burner comprises outer and inner tubular thermocouple members 14a and 14b having a port through which the fuel issues, and, when ignited, forms the pilot burner. The outer and inner tubular thermocouple members are joined adjacent said port to form a thermal junction adapted to be heated by the pilot flame. Other forms of pilot burner and thermocouple means may be employed within the scope of the present invention.

In the illustrated embodiment of the invention, an inner tubular lead conductor 85 receives fuel from the passageway 81 and delivers the same to the pilot outlet port and, at the same time, connects the inner thermocouple member 14b thermoelectrically in circuit with the terminal stud 79 and through the conductor 78 in circuit with the electromagnet 70. An outer tubular lead conductor 86 surrounds and is insulated from the inner lead conductor 85 and grounds the outer thermocouple member 14a through a metallic quick detachable connector sleeve or thimble 88 to the housing 20. A conical enlargement 90 on the inner lead conductor 85 seats in the correspondingly formed outer end of the recess 82 and is held seated by the threaded engagement of the connector sleeve 88 with a boss or extension on the housing 20 as shown at 92, thus forming a quick detachable and, at the same time, a positive and fuel-tight connection.

The armature or keeper 72 is fixed at 72' upon the inner end of the thermostat rod 54, and is movable within the tube 52 lengthwise thereof between the plug 58 on one side and the combined permanent magnet 64, Curie point member 68, and electromagnet 70 on the other side. The armature or keeper 72 is formed of soft iron or of an alloy or other suitable material adapted to be held in attracted position to the Curie point member 68 and the magnet frame of the electromagnet so long as the member 68 is magnetic and the electromagnet 70 is energized by the thermoelectric current set up by the heat of the pilot flame on the thermocouple.

The magnetic strength of the Curie point member 68 and permanent magnet 64 at temperatures below the critical temperature of the Curie point material is insufficient alone to hold the armature or keeper 72 in attracted position against the tension of the spring 30'. At the same time, the magnetic strength of the electromagnet, when energized by the heat of the pilot flame on the thermocouple, is also insufficient alone to hold the armature or keeper 72 in attracted position. However, when the electromagnet 70 is energized and the temperature to which the Curie point member 68 is subject is below the critical temperature of this member, the combined or conjoint action of the electromagnet 70 and the magnetic means comprising the permanent magnet 64 and Curie point member 68 is sufficient to hold the armature or keeper 72 in attracted position.

In operation, as long as the temperature to which the Curie point member is subjected is below the critical temperature and the electromagnet is energized by the heat of the pilot flame the keeper 72 is attracted and held in attracted position. Movement of the armature to attracted position causes endwise movement of the rod 54 to the right, as viewed in Figure 2. This moves the valve disc 30 from its seat 32 thereby opening the valve to set up and maintain a supply of fuel to the main burner as long as the armature is in attracted position.

If the safety temperature of the water in the tank 6 is exceeded, the Curie point member 68 instantly becomes nonmagnetic or of insufficient magnetic strength conjointly with the electromagnet 70 to hold the armature 72 in attracted position. As a result, the armature is released and the spring 30' moves the valve member 30 to closed position completely to shut off the supply of fuel to the burner 9. Upon movement of the valve member 30 to closed position, the armature 72 is moved to retracted position as shown in Figure 2.

On the other hand, upon extinguishment of the pilot flame, the electromagnet 70 ceases to be energized sufficiently conjointly with the magnet 64 and Curie point member 68 to hold the armature 72 in attracted position. Therefore, if either the pilot flame is extinguished or the desired safety temperature is exceeded, or upon other abnormal, defective, or insufficient functioning or non-functioning of the apparatus, the armature is released and the valve 30 closes to shut off the supply of fuel to the main burner 9.

When the temperature drops below the predetermined temperature with the pilot light burning the Curie point member becomes magnetic or of sufficient magnetic strength to attract the armature 70 moving the valve member to open position and maintaining same open until the predetermined temperature is again reached or exceeded or the pilot light extinguished.

By rotating the knob or finger piece 38 to set the pointer 42 at the desired temperature marking at 44, the spring 30' is tensioned an amount to actuate the keeper to retracted position and close the valve at the selected temperature. Therefore when I refer to the critical temperature in the present specification and in the appended claims I refer to the temperature at which the Curie point member becomes of insufficient strength to hold the valve member 30 open against the tension of the spring for the particular setting as indicated by the pointer 42. Of course the critical temperature may be the temperature at which the Curie point member becomes actually non-magnetic or substantially non-magnetic.

In the embodiment of the invention shown in Figure 1 the Curie point member 68 is of such character that its critical temperature at which it becomes non-magnetic, or at least of insufficient magnetic strength conjointly with the electromagnet 70 to hold the armature in attracted position, is the same as he maximum safety temperature of the water in the tank. This may vary widely. Where the device is used in connection with oven heaters, space heaters, or other devices, the Curie point member 68 will be of such character that its critical temperature will be the same as the maximum safety temperature at which the safety shut-off device is to operate to shut off the supply of fuel to the main burner. Where the device is to operate to safety shut-off position upon other abnormal, defective, or insufficient functioning or non-functioning of the apparatus, an electric heater circuit may be provided for heating the Curie point material, and this circuit may be controlled by such other abnormal, defective, or insufficient functioning or non-functioning of the apparatus.

From the foregoing it will be apparent that the device is of simple and inexpensive construction, is effective and reliable in operation, is easy to assemble and install, and has a quick or snap acting shut-off for shutting off the supply of fuel at the desired temperature or upon other abnormal, defective, or insufficient functioning or non-functioning of the apparatus and also upon extinguishment of the pilot flame.

I have described the invention in connection with the details of a particular embodiment, but I do not itnend thereby to limit the invention to such details, nor do I intend to be limited to the particular embodiment and relation of the essential features shown and described.

For example, within the broader aspects of the invention, the valve member 30 constitutes a control member. An electric switch may, within such broader aspects, be employed in lieu of the valve member 30. Where employed in lieu of the valve member 30 of the present invention, such switch may be held closed so long as the Curie point member 68 is magnetic and the electromagnet 70 is energized and released for actuation to open circuit position upon heating of the Curie point member to its critical temperature or upon extinguishment of the pilot flame. The switch may, for example, maintain a circuit for a solenoid or motor valve closed to hold such valve open for a supply of fuel as long as the Curie point member is not heated to its critical temperature and the pilot burner is ignited. Then at the critical temperature, or upon extinguishment of the pilot flame, the switch would open the circuit for the solenoid or motor valve, and this valve would operate to closed position to shut off the supply of fuel to the main burner.

In Figure 3 I have shown the invention embodied in a heat regulator of the type comprising means for controlling the supply of fuel to the heating apparatus, means for setting the device for the desired temperature, and thermally operative means for operating the control means with temperature changes to maintain substantially selected temperatures.

This latter embodiment of the invention is the same as the preceding embodiment except in the following respects. The tube and rod constitute in this case a rod and tube type thermostat well known in the art. The tube is composed of a thermally responsive metal which has a coefficient of expansion different from the coefficient of expansion of the metal rod. In the particular embodiment shown in Figure 3, the coefficient of expansion of the tube is greater than that of the rod. The rod may, for example, be made of a material which is substantially free from contraction and expansion under temperature changes, and the tube may be made of a metal having a relatively high coefficient of expansion.

The stem 35' constitutes a temperature adjusting or selecting stem and extends through and is rotatable in a limit control member 102. At its inner end the stem 35' has a diametrically extending pin 104 or other means which engages, for example, in a diametrical slot 105 in the outer end of the valve member 30'' to turn the valve member 30'' upon rotation of the stem 35'. The valve member 30'' is threaded upon the outer end of the thermostat rod 54', and the rod 54' is splined or keyed against turning movement, for example at 106, being at the same time free for endwise movement as before. The spring 108, which corresponds with the spring 30' of the preceding embodiment, is interposed between the valve member 30'' and the spring cup 34'.

The limit control member 102 is threaded through the valve cap 36', and the stem 35' has a flange or shoulder 110 which is positioned between the spring cup 34' and the inner end of the member 102. A spring 112 holds the flange or shoulder 110 against the inner end of the limit control member 102, and also serves to compress and hold the packing 114 in tight sealing relation about the stem 35' and the opening in the member 102 through which the stem extends.

In operation of the embodiment shown in Figure 3, by grasping the knob 38' and turning the stem 35', the valve 30'' may be threaded along the rod 54' to provide any desired amount of valve opening to maintain any desired temperature as indicated by the pointer.

With the selecting means set to provide a valve opening for the selected temperature if the temperature exceeds the selected temperature, there will be a proportionate expansion of at least the thermally sensitive tube. The tube expanding at least more than the rod 54' tends to draw the valve closer to its seat to maintain the selected temperature. If the temperature drops below the selected temperature, the tube contracts with respect to the rod 54' and, as a result, the rod 54' forces the valve 30'' farther away from its seat to increase the valve opening.

The shut-off temperature may be adjusted by turning the limit control member to increase or decrease the tension in the spring 108. When the knob 38' is turned to adjust the position of the valve member 30'', the movement of the valve member changes the tension in the spring 108 and, thereby, the shut-off or limit control temperature. However, by turning the limit control member 102 the shut-off temperature may be adjusted to any desired temperature with any selected positioning of the valve member 30''.

For the purpose of indicating the shut-off or limit control temperature and the temperature which the thermostat is to maintain, the knob 38' has a pointer 120 which turns with the knob 38' and stem 35', and may be set and secured in different angular positions with respect to the stem 35' to calibrate it relative to its scale. The pointer 120 is shown as cooperating with a dial or scale marked, for instance, on the valve cap 36', at 121, to indicate the temperature which the valve member 30'' is set to maintain. Either a portion of the same pointer 120 or another pointer 122, which also turns with the knob 38' and stem 35', cooperates with a dial or scale marked, for instance, on the limit control member 102, at 124, to indicate the temperature at which the Curie point member will operate to release the valve member for movement to safety shut-off position.

Turning of the member 102 to bring any desired temperature marking thereon in register, for instance, with the pointer 122, sets the device so that the valve member 30'' will close at that temperature. Turning of the knob 38' to bring the pointer 120 into register with the desired temperature marking on the scale or dial 121 sets the valve member 30'' in position to maintain the selected temperature. When the position of the valve is changed to change the temperature to be maintained and thereby, by changing the tension in the spring 108, changes the safety shut-off temperature, the device may be set for the same safety shut-off temperature as before, or for any other shut-off temperature by turning the limit control member 102.

In the combination shown in Figure 3, the thermostatic means for maintaining the selected temperature is operative only as long as the armature or keeper shown at 72 in Figure 2 is held in attracted position. Movement of the keeper to retracted position not only provides a snap-acting shut-off as before, but also renders the rod and tube thermostat inoperative.

I claim:

1. In a device of the class described, an armature, a Curie point member, a permanent magnet and an electromagnet operable conjointly to hold said armature attracted as long as the electromagnet is energized and the temperature adjacent the Curie point member does not exceed the critical temperature of said member, means for actuating said armature to retracted position upon either a rise in the temperature adjacent the Curie point member to the critical temperature of said member or deenergization of said electromagnet, a control member, and a rod between said armature and said control member for holding said control member in operating position as long as the armature is in attracted position and releasing said control member for movement to safety position upon movement of the armature to retracted position.

2. In a device of the class described, an armature, a Curie point member, a permanent magnet and an electromagnet operable conjointly to hold said armature attracted as long as the electromagnet is energized and the temperature adjacent the Curie point member does not exceed the critical temperature of said member, means for actuating said armature to retracted position upon either a rise in the temperature adjacent the Curie point member to the critical temperature of said memer or deenergization of said electromagnet, a control member, and a rod between said armature and said control member for holding said control member in operating position as long as the armature is in attracted position and releasing said control member for movement to safety position upon movement of the armature to retracted position, said rod constituting one of a pair of thermostatic members having different coefficients of expansion and operable by the differences in expansion of said members to move said control member to different controlling positions between full operating position and safety position as long as the electromagnet is energized and the temperature adjacent the Curie point member does not exceed the critical temperature of said member.

3. In a device of the class described, a valve body having a valve seat therein, a valve member cooperable with said seat to shut off the flow through the valve body and having an open position out of cooperation with the valve seat, a tube extending from said valve body, a slidably supported rod disposed within said tube and cooperating with said valve member, magnetic means comprising a Curie point member, a permanent magnet and an electromagnet fixed within said tube, and a keeper on said rod in juxtaposition to said Curie point member and said electromagnet, said keeper being adapted to be held attracted to the Curie point member and the electromagnet to hold the valve member open at temperature below the critical temperature of the Curie point member and as long as the electromagnet is energized, and released for movement of the valve member to closed position at substantially the critical temperature of the Curie point member.

4. In a device of the class described, in combination, a valve housing, a valve in said housing, a tube extending from said housing, a rod disposed within said tube and extending into the valve housing for cooperation with said valve, a keeper on said rod, a Curie point member and an electromagnet mounted in said tube and operable conjointly to hold said keeper in attracted position and thereby said valve in open position, said keeper being released for movement to retracted position upon discontinuance of the holding action of either said Curie point member or said electromagnet, and spring means acting against said valve to close same upon release of said keeper.

5. In a device of the class described, in combination, a main burner, a fuel supply pipe leading to said burner, control means for controlling the supply of fuel through said pipe, a pilot burner in juxtaposition to said main burner, means under the control of said pilot burner, and a member of Curie point material adapted for operation conjointly with said last means when said last means is operative to render said control means operative when the temperature to which said Curie point material is subject is below the critical temperature of said Curie point material and, when the pilot flame is ignited, the means under the control of the pilot burner and the Curie point material being each incapable alone of rendering said control means operative whereby the control means is actuated to safety position upon extinguishment of the pilot burner and when the temperature adjacent the Curie point material exceeds the critical temperature thereof.

6. In a device of the class described, in combination, a main burner, a fuel supply pipe leading to said burner, a valve in said pipe, spring means for actuating said valve to closed position, a pilot burner in juxtaposition to said main burner, means under the control of said pilot burner, a member of Curie point material adapted for operating conjointly with said last means when said last means is operative to render said valve operative when the temperature to which the Curie point material is subject is below the critical temperature of said Curie point material and when the pilot burner is ignited, and a source of magnetic flux for said Curie point member, the means under the control of the pilot burner and the Curie point material being each incapable alone of rendering said valve operative whereby said valve is actuated to closed position by said spring means upon extinguishment of the pilot burner and when the temperature adjacent said Curie point material exceeds the critical temperature thereof.

7. In a device of the class described, in combination, a main burner, a fuel supply pipe leading to said burner, control means for controlling the supply of fuel through said pipe, a pilot burner in juxtaposition to said main burner, a thermocouple placed in position to be heated by said pilot burner, an electromagnet connected in circuit with said thermocouple, a member of Curie point material, and a source of magnetic flux for said Curie point member, said Curie point member being adapted for operation conjointly with said electromagnet to render said control means operative when the temperature to which the Curie point member is subject is below the critical temperature of the Curie point member and, when the pilot burner is ignited, the electromagnet connected to the thermocouple and the Curie point member being each incapable alone of rendering said control means operative whereby the control means is actuated to safety position upon extinguishment of the pilot burner and when the temperature adjacent the Curie point member exceeds the critical temperature thereof.

8. In a device of the class described, in combination, a main burner, a fuel supply pipe leading to said main burner, a valve in said pipe, spring means for actuating said valve to closed position, a pilot burner in juxtaposition to said main burner, a thermocouple placed in position to be heated by said pilot burner, an electromagnet connected in circuit with said thermocouple, a member of Curie point material, and a source of magnetic flux for said Curie point member, said Curie point member being adapted for operation conjointly with said electromagnet to render said valve operative when the temperature to which the Curie point member is subject is below the critical temperature of the Curie point member and when the pilot burner is ignited, the electromagnet connected to the thermocouple and the Curie point member being each incapable alone of rendering said valve operative whereby said valve is actuated to closed position by said spring means upon extinguishment of the pilot burner and when the temperature adjacent said Curie point member exceeds the critical temperature thereof.

9. In a device of the class described, in combination, thermostatic means, control means adapted for actuation thereby, and magnetic means comprising a member of Curie point material and an electromagnet operable conjointly to render said thermostatic means operative to actuate said control means with temperature changes below the critical temperature of said Curie point member and releasing said control means for movement to safety position at substantially the critical temperature of said Curie point member and upon substantial deenergization of said electromagnet.

10. In a device of the class described, in combination, thermostatic means, control means adapted for actuation thereby, magnetic means comprising a member of Curie point material and an electromagnet operable conjointly to render said thermostatic means operative to actuate said control means with temperature changes below the critical temperature of the Curie point member and releasing said control means for movement to safety position at substantially the critical temperature of said Curie point member and upon substantial deenergization of said electromagnet, and selecting means for setting said control means to different selected positions and operative only at temperatures below substantially the critical temperature of said Curie point member and when said electromagnet is energized.

11. In combination, a main burner, a fuel supply pipe leading to said burner, a valve in said pipe, a thermostat controlling said valve, a supply pipe for a pilot light in juxtaposition to said main burner, a thermocouple in position to be heated by said pilot light, and magnetic means comprising an electromagnet connected in circuit with said thermocouple, a Curie point member, and a permanent magnet, said electromagnet and said Curie point member being adapted conjointly to render said thermostat operative to actuate said valve, the electromagnet and Curie point member being each incapable alone of rendering said thermostat operative to actuate said valve.

12. In combination, a main burner, a fuel supply pipe leading to said burner, a valve in said pipe, a thermostat controlling said valve, a supply pipe for a pilot light in juxtaposition to said main burner, a thermocouple in position to be heated by said pilot light, magnetic means comprising an electromagnet connected in circuit with said thermocouple, a Curie point member, and a permanent magnet, said electromagnet and said Curie point member being adapted conjointly to render said thermostat operative to actuate said valve, the electromagnet and Curie point member being each incapable alone of rendering said thermostat operative to actuate said valve, and selecting means for setting said valve to different selected positions and operative only during conjoint operation of said electromagnet and said Curie point member.

13. In a device of the class described, in combination, a housing, a control member in said housing, a spring retainer in said housing, a spring interposed between said control member and said retainer, selecting means cooperable with said spring retainer for setting said control member to different selected positions, a rod and tube thermostat extending from said housing, said rod cooperating at one end with said control member to operate said control member and maintain substantially selected temperatures, a keeper on the opposite end of said rod, and magnetic means fixed in said tube and comprising a member of Curie point material and an electromagnet adapted conjointly to hold said keeper in attracted position for actuation of said control member by said thermostat upon changes in temperature below the critical temperature of the Curie point member and as long as said electromagnet is energized.

14. In a device of the class described, in combination, a housing, a control member in said housing, a rod and tube thermostat extending from said housing, an annular permanent magnet fixed in said tube, an annular member of Curie point material fixed in said tube adjacent said permanent magnet, an electromagnet fixed in said permanent magnet, said rod extending through said permanent magnet, said Curie point member and said electromagnet, and a keeper on said rod adapted to be held in attracted position by the conjoint magnetic action of said Curie point member and said electromagnet.

15. In a device of the class described, in combination, a valve, a tube, a rod disposed within said tube and cooperating with said valve at its outer end, magnetic means comprising a Curie point member and an electromagnet near the inner end of said tube for holding the inner end of said rod to said tube to hold said valve open at temperatures below the critical temperature of the Curie point member and when the electromagnet is energized, and means at the outer end of the device for adjusting the temperature at which the valve is released for movement to safety shut-off position.

16. In a device of the class described, in combination, a control member having an operating position and a safety shut-off position, means comprising an electromagnet and a permanent magnet, each incapable alone of holding said control member in operating position but operable conjointly to hold said control member in operating position, a thermocouple adapted to be subjected to the heat of a flame and connected in circuit with said electromagnet, said electromagnet being deenergized for movement of said control member to safety shut-off position upon extinguishment of the flame, and means for rendering said permanent magnet ineffective for holding said control member in operating position, thereby permitting movement of said control member to safety shut-off position, when the temperature reaches a critical temperature.

17. In a device of the class described, in combination, a valve housing having an inlet and an outlet, a valve member controlling the flow through said housing, a tube secured to said housing and projecting therefrom, a rod extending through said tube and into said valve housing and having motion imparting cooperation with said valve member, and means disposed within said tube and comprising a Curie point member and an electromagnet operative when the electromagnet is energized and the temperature is below the critical temperature of the Curie point member to hold said rod shifted in a direction to hold said valve member in open position, said Curie point member at substantially the critical temperature thereof releasing said rod for movement in a direction for movement of the valve member to closed position.

18. In a device of the class described, in combination, a valve housing having an inlet and an outlet, a valve member controlling the flow through said housing, a cap member on said valve housing, adjusting means carried by said cap member, spring means confined between said valve member and said adjusting means, a tube secured to said housing and projecting therefrom, an axially shiftable rod extending through said tube and into said valve housing and having motion imparting cooperation with said valve member, and means disposed within said tube and comprising a Curie point member and an electromagnet operative when the electromagnet is energized and the temperature is below the critical temperature of the Curie point member to hold said rod shifted in a direction to hold said valve in open position, said Curie point member at substantially the critical temperature thereof and said electromagnet when deenergized releasing said rod for movement in a direction for movement of said valve member to closed position.

19. In control apparatus of the class described, in combination, a controlling member, a thermostatic member having motion imparting cooperation with said controlling member, and means comprising a Curie point member and an electromagnet for holding a portion of said thermostatic member in relatively fixed position when the electromagnet is energized and the temperature is below the critical temperature of the Curie point member and releasing the held portion of said thermostatic member at substantially the critical temperature of said Curie point member and when the electromagnet is deenergized.

20. In a device of the class described, in combination, a rod and tube thermostat comprising a rod and a tube surrounding said rod, said rod and tube being formed of thermally responsive materials having different coefficients of expansion, means comprising an electromagnet releasably holding said rod to said tube, and a controlling member operable when said rod is held to said tube to different controlling positions by differences in expansion of said rod and tube, said holding means being operable upon deenergization of the electromagnet to release said rod from said tube for movement of said controlling member to safety position.

21. In a device of the class described, in combination, a rod and tube thermostat comprising a rod and a tube surrounding said rod, said rod and tube being formed of thermally responsive materials having different coefficients of expansion, means comprising an electromagnet releasably holding said rod to said tube, a controlling member operable when said rod is held to said tube to different controlling positions by differences in expansion of said rod and tube, said holding means being operable upon deenergization of the electromagnet to release said rod from said tube for movement of said controlling member to safety position, and a thermoelectric generator adapted to be subjected to the heat of a flame and connected in circuit with said electromagnet for energizing the electromagnet as long as the thermoelectric generator is heated by the flame and discontinuing energization of the electromagnet upon extinguishment of the flame.

HAROLD A. MANTZ.